United States Patent [19]

Shino et al.

[11] Patent Number: 5,724,950
[45] Date of Patent: Mar. 10, 1998

[54] EXHAUST GAS RECIRCULATING CONTROLLER

[75] Inventors: Toshikazu Shino, Chigasaki; Kazushige Yokota, Zama, both of Japan

[73] Assignee: Nissan Motor Co., Ltd., Kanagawa, Japan

[21] Appl. No.: 801,894

[22] Filed: Feb. 18, 1997

[30] Foreign Application Priority Data

Mar. 21, 1996 [JP] Japan ............................ 8-064566

[51] Int. Cl.$^6$ .................... F02D 41/14; F02M 25/07
[52] U.S. Cl. ................................. 123/676; 123/571
[58] Field of Search ............................ 123/676, 568, 123/569, 571; 364/431.06

[56] References Cited

U.S. PATENT DOCUMENTS

| | | | |
|---|---|---|---|
| 4,534,334 | 8/1985 | Murakami et al. | 123/571 |
| 4,790,286 | 12/1988 | Nishida et al. | 123/571 |
| 5,005,552 | 4/1991 | Kawamura | 123/571 |
| 5,205,260 | 4/1993 | Takahashi et al. | 123/571 |
| 5,503,129 | 4/1996 | Robichaux et al. | 123/571 |
| 5,520,161 | 5/1996 | Klopp | 123/676 |
| 5,524,591 | 6/1996 | Hirota et al. | 123/571 |
| 5,579,743 | 12/1996 | Kadowaki | 123/571 |
| 5,601,068 | 2/1997 | Nozaki | 123/676 |

FOREIGN PATENT DOCUMENTS 63-179171   7/1988   Japan.

OTHER PUBLICATIONS

*JSME Mechanical Engineer's Handbook*, p. B5–209, Japan Society of Mechanical Engineering, Jan. 1986.

*Primary Examiner*—Willis R. Wolfe
*Attorney, Agent, or Firm*—Lowe, Price, LeBlanc & Becker

[57] ABSTRACT

An exhaust passage is connected to an intake passage of an engine through an exhaust recirculating valve. A target opening of the exhaust recirculation valve is first set according to a target exhaust recirculation rate depending on engine running conditions, the total intake air flow cross-sectional area of the engine, and a first correction value set according to the exhaust pressure. By applying this corrected value, the same EGR is always obtained on both low ground and high ground regardless of the engine running conditions. Preferably, the target opening is further corrected by a second correction value set based on the exhaust temperature.

5 Claims, 7 Drawing Sheets

EXHAUST GAS RECIRCULATING CONTROLLER

FIELD OF THE INVENTION

This invention relates to control of exhaust gas recirculation of an engine.

BACKGROUND OF THE INVENTION

In order to reduce discharge of nitrogen oxides (NOx) from an automobile engine, a system is known where a part of the exhaust gas of the engine is recirculated to the intake passage. This system is called an exhaust gas recirculation system (hereinafter referred to as EGR system).

Regarding the control of this EGR system,

Tokkai Sho 63-179171 published by the Japanese Patent Office in 1988 discloses how the opening of an EGR valve controlling an EGR amount is corrected according to the atmospheric pressure. Even for the same engine running conditions such as engine speed or load there is a tendency, for example, for the EGR amount on high ground to decrease for the same EGR valve opening as on low ground because the atmospheric density is lower on high ground. Conventionally therefore, the atmospheric pressure was detected by a sensor, and the EGR amount corrected according to the decrease of atmospheric pressure.

However, the decrease of EGR rate, which is the rate of EGR flowrate to total intake air flowrate, due to drop of atmospheric pressure is different according to the engine rotation speed and load. FIG. 14 compares the EGR rate on high ground and low ground. As can be seen from this diagram, the EGR rate on high ground differs according to engine-speed and load, so the same EGR rate could not be obtained by correcting the EGR flowrate based only on the atmospheric pressure.

SUMMARY OF THE INVENTION

It is therefore an object of this invention to achieve EGR control which is not subject to the effect of altitude differences for all engine running conditions by integrating engine speed and engine load in EGR control based on atmospheric pressure.

It is another object of this invention to implement the above EGR control by a simple construction.

In order to achieve the above objects, this invention provides an exhaust gas recirculation controller for use with such an engine that comprises an intake passage and exhaust passage connected by an exhaust gas recirculation passage provided with an exhaust recirculation valve. The controller comprises a mechanism for detecting a running state of the engine, a mechanism for setting a target exhaust gas recirculation rate according to the running state, a mechanism for computing a total intake air flow cross-sectional area of the engine comprising the air intake passage, a mechanism for setting a first correction amount of the target exhaust gas recirculation rate according to an exhaust pressure of the engine, a mechanism for setting a target opening amount of the exhaust gas recirculation valve based on the target exhaust recirculation rate, total intake flow cross-sectional area and first correction value, and a mechanism for controlling the opening of the exhaust gas recirculating valve to the target opening.

It is preferable that the controller further comprises a mechanism for detecting an exhaust temperature of the engine, and a mechanism for setting a second correction value of the target exhaust gas recirculation rate based on the exhaust temperature, wherein the target opening amount setting mechanism sets the target opening amount of the exhaust gas recirculation valve based on the target exhaust gas recirculation rate, the total intake air flow cross-sectional area, the first correction value and the second correction value.

In this case, it is further preferable that the exhaust temperature detecting mechanism comprises a mechanism for detecting a rotation speed of the engine.

It is also preferable that the exhaust temperature detecting mechanism comprises an air flow meter for detecting intake air flowrate of the engine.

It is also preferable that the intake passage comprises a throttle and an auxiliary air passage provided with an auxiliary air valve for bypassing the throttle, and the computing mechanism comprises a mechanism for detecting an opening of the throttle, a mechanism for detecting an opening of the auxiliary air valve, and a mechanism for calculating the total intake air flow cross-sectional area from the opening of the throttle and the opening of the auxiliary air valve.

The details as well as other features and advantages of this invention are set forth in the remainder of the specification and are shown in the accompanying drawings.

DESCRIPTION OF THE PREFERRED EMBODIMENTS

Figure 1:
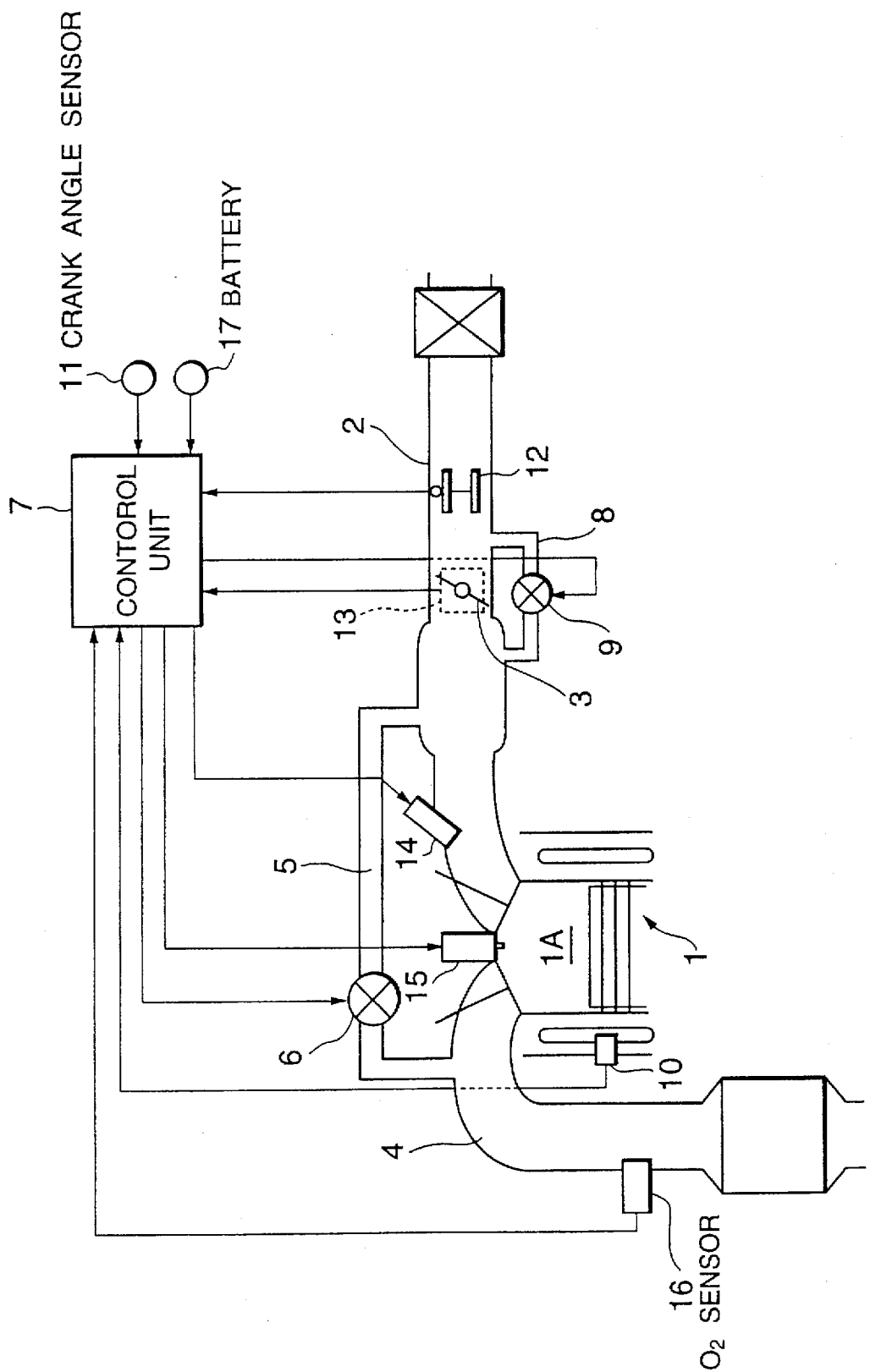
FIG. 1 is a schematic diagram of an EGR controller according to this invention.
Figure 2:
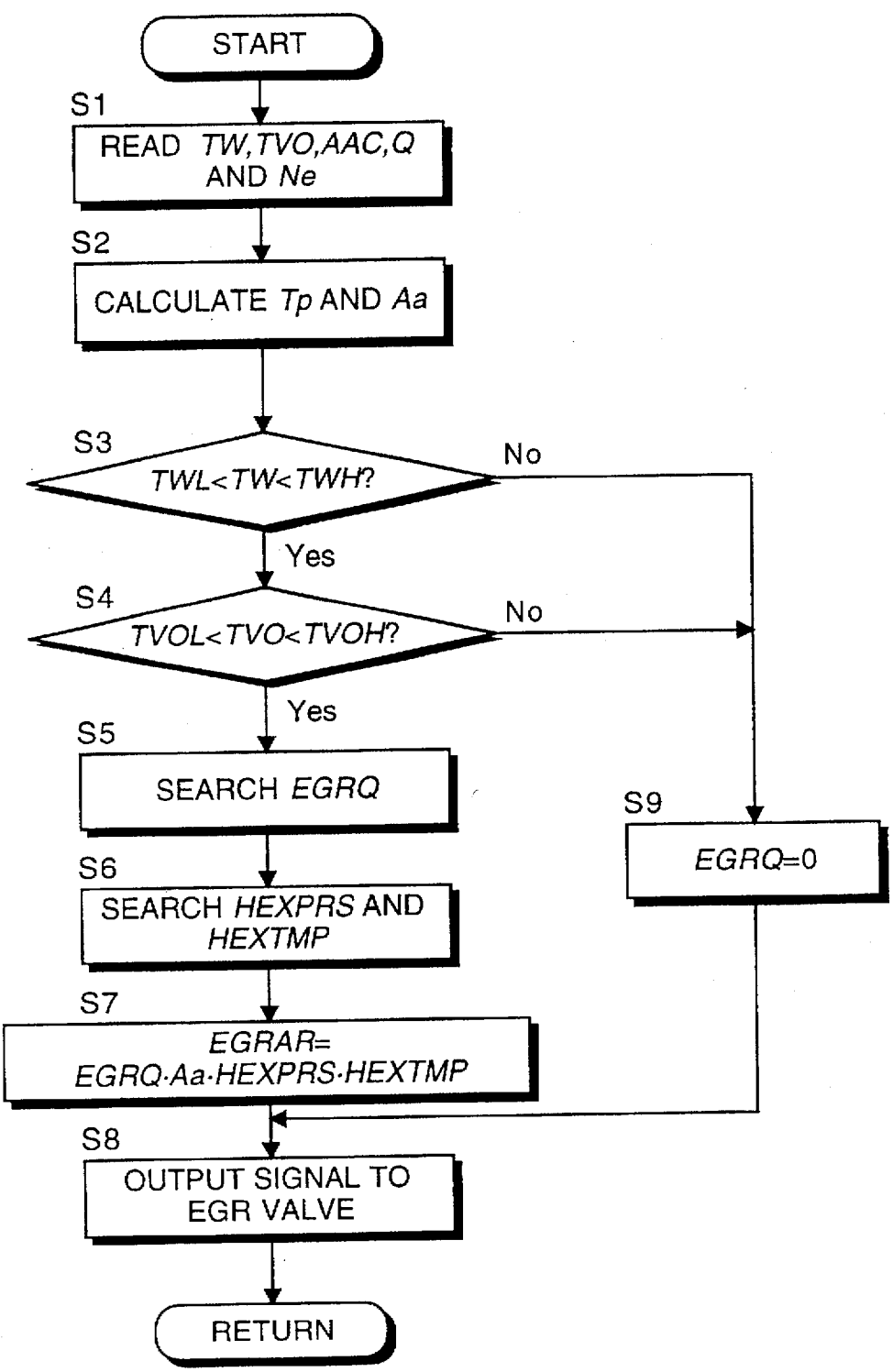
FIG. 2 is a flowchart describing a control process performed by the EGR controller.

Referring to FIG. 1 of the drawings, a throttle 3 is provided in an intake passage of a vehicle engine, and an EGR passage 5 from an exhaust passage 4 is connected to an intake passage 2 downstream of the throttle 3.

An auxiliary air passage 8 which bypasses the throttle 3 is further provided in the intake passage 8. An auxiliary airflow control valve 9 is provided in the auxiliary air passage 8 to increase or decrease an auxiliary airflow amount so as to control the engine rotation speed to a target value, according to a control signal output by a control unit 7.

An EGR valve 6 for controlling flowrate is provided in the EGR passage 5. The EGR valve 6 is driven by a step motor, and its opening is varied by a control signal from the control unit 7.

Signals from a water temperature sensor 10 which detects an engine cooling water temperature Tw of the engine 1, a crank angle sensor 11 which detects the rotation speed Ne of the engine 1, an air flow meter 12 which detects an intake air flowrate Q of the engine 1, a throttle sensor 13 which detects an opening TVO of the throttle 3, and an $O_2$ sensor 16 which detects the oxygen concentration of the exhaust, are input to the control unit 7. A battery voltage $V_B$ is also input from a battery 17.

The control unit 7 controls a fuel injection amount and fuel injection timing of an injector 14 provided in the intake passage 2 according to running conditions of the engine 1 determined from these input signals, and controls an ignition timing of a spark plug 15 provided in a combustion chamber 1A of the engine 1. Further, the control unit 7 controls EGR flowrate via the EGR valve 6 and the auxiliary air flowrate via the auxiliary airflow control valve 9.

Next, the EGR flow control process performed by the control unit 7 according to this invention will be described. This process is executed in synchronism with the rotation speed of the engine 1, or at a predetermined interval.

In a step S1, the cooling water temperature Tw detected by the water temperature sensor 10, the throttle opening TVO detected by the throttle sensor 13, an opening command value AAC of the auxiliary air control-valve 9, an intake air flowrate Q detected by the air flow meter 12 and the engine rotation speed detected by the crank angle sensor 11 are read.

Figure 11:
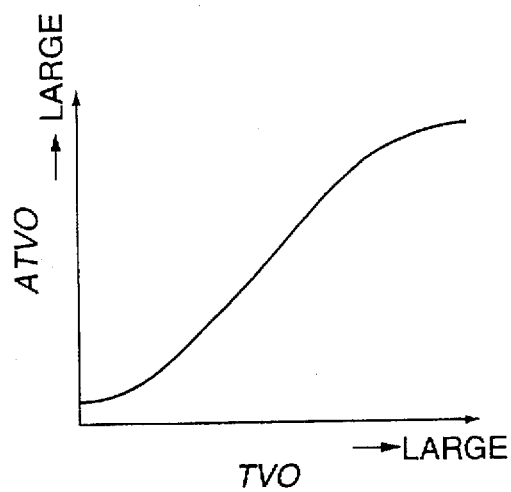
FIG. 11 is graph showing the contents of a map of an intake passage opening area ATVO stored in the EGR controller
Figure 12:
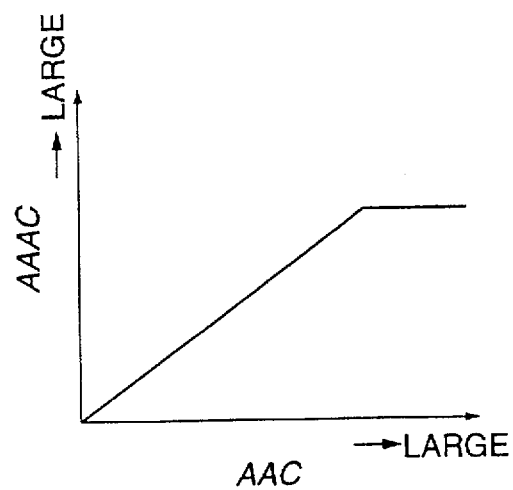
FIG. 12 is graph showing the contents of a map of an auxiliary air passage opening area AAAC stored in the EGR controller

In a step S2, a cylinder intake air volume, i.e. an air volume aspirated in the combustion chamber 1A on every combustion cycle is calculated from the intake air flowrate Q and engine speed Ne, and a basic fuel injection amount Tp which is directly proportional to this cylinder intake air volume is calculated. The concept of this basic injection amount is disclosed for example in U.S. Pat. No. 5,345,921. In this step S2, a total opening cross sectional area Aa of the intake system is then calculated as a sum of an opening area ATVO of the intake passage 2 found from the throttle opening TVO by looking up a map shown in FIG. 11 and an opening area AAAC of the auxiliary passage 8 found from the opening command value AAC of the auxiliary air control valve 9 by looking up a map shown in FIG. 12.

In steps S3 and S4, it is determined whether or not to perform EGR depending on whether or not the following conditions are satisfied. In the step S3, it is determined whether or not the cooling water temperature Tw is within a range defined by a lower limit TwL and upper limit TwH. Similarly in a step S4, it is determined whether or not the throttle opening TVO is within a range defined by a lower limit TVOL and upper limit TVOH.

When both of these conditions are satisfied, the routine proceeds to a step S5 to execute EGR. In the case where either condition is not satisfied, the routine proceeds to a step S9, and EGR is stopped by setting a target EGR rate EGRQ=0.

In a step S5, the target EGR rate EGRQ is set according to the driving conditions of the engine 1. Specifically, a map shown in FIG. 3 which determines the target EGR rate EGRQ for different regions according to for example the basic fuel injection amount Tp and engine rotation speed Ne which represent the engine load, is first stored in the control unit 7, and the target EGR rate EGRQ is found by referring to this map.

In a step S6, an exhaust pressure correction value HEX-PRS and exhaust temperature correction value HEXTMP are set. The reason for and method of setting the exhaust pressure correction value HEXPRS and exhaust temperature correction value HEXTMP will now be described.

In the low lead region of the engine 1, the target EGR rate EGRQ is set by the following formula (1):

$$EGRQ = K \cdot \frac{EGRAR}{Aa} \cdot \frac{\text{exhaust pressure}}{\text{atmospheric pressure}} \cdot \sqrt{\frac{\text{outside temperature}}{\text{EGR gas temperature}}} \quad (1)$$

where,
K=constant and
EGRAR=EGR valve opening area

The EGR rate is a value defined by the EGR gas mass flow rate/intake air mass flow rate. In the low lead region of the engine, the pressure difference upstream and downstream of the throttle 3 and the pressure difference upstream and downstream of the EGR valve 6 are both large, so the intake air and EGR gas may both be considered to form sonic flows which pass through these valves. The process of obtaining the above equation (1) will be discussed later.

Modifying the above equation (1), the following equation (2) for the opening area EGRAR of the EGR valve 9, which is the object of control according to this invention, is obtained:

$$EGRAR = \frac{1}{K} \cdot EGRQ \cdot Aa \cdot \frac{\text{atmospheric pressure}}{\text{exhaust pressure}} \cdot \sqrt{\frac{\text{EGR gas temperature}}{\text{outside temperature}}} \quad (2)$$

Therefore, when determining the EGR valve opening area, a correction corresponding to $$\frac{\text{atmospheric pressure}}{\text{exhaust pressure}}$$

and a correction corresponding to $$\sqrt{\frac{\text{EGR gas temperature}}{\text{outside temperature}}}$$

in the aforesaid equation (2), must be applied. As the amplitude of exhaust pressure variations is larger than that of atmospheric pressure variations, and the amplitude of EGR gas temperature variations is larger than that of atmospheric temperature variations, the precision of correction can be maintained in practice even when the above angular corrections are based on exhaust pressure and exhaust temperature.

Figure 4:
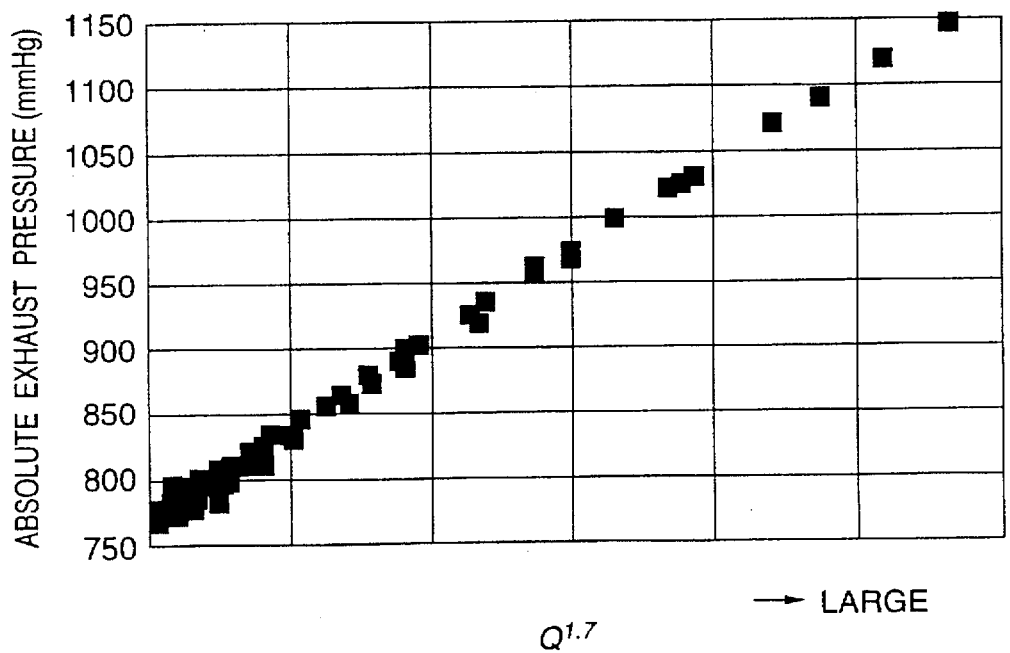
FIG. 4 is a graph showing a relation between an absolute exhaust pressure and an intake air flowrate.

Concerning the relation between atmospheric pressure and exhaust pressure, it is known that (absolute exhaust pressure−absolute atmospheric pressure) and the 1.7 power of the intake air flowrate Qare effectively proportional, as shown in FIG. 4.

Figure 5:
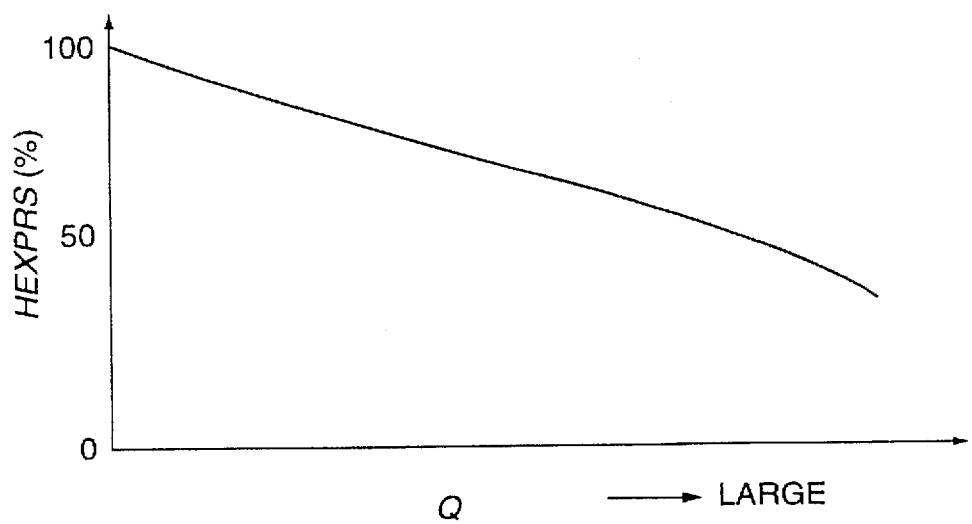
FIG. 5 is a graph showing the contents of a map of an exhaust pressure correction value HEXPRS stored in the EGR controller.

Therefore, the exhaust pressure correction value HEXPRS which corresponds to $$\frac{\text{atmospheric pressure}}{\text{exhaust pressure}}$$

is determined according to the intake air flowrate Q as shown in FIG. 5. A map of this type is stored in the control unit 7 beforehand, and in the step S6, reference is made to this map to determine the exhaust pressure correction value HEXPRS from the intake air flowrate Q.

Figure 6:
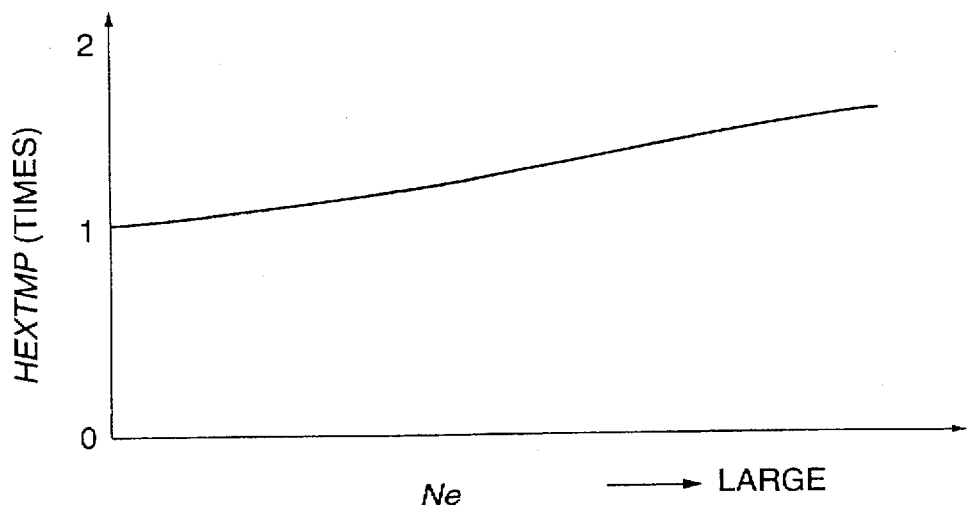
FIG. 6 is a graph showing the contents of a map of an exhaust temperature correction value HEXTMP stored in the EGR controller.

The exhaust temperature depends mainly on the engine rotation speed Ne, and it increases the larger Ne is. Therefore, the exhaust temperature correction value HEXTMP which corresponds to $$\sqrt{\frac{\text{EGR gas temperature}}{\text{outside temperature}}}$$

is determined according to the engine speed Ne as shown in FIG. 6. A map of this type is stored in the control unit 7 beforehand, and reference is made to this map to determine the exhaust temperature correction value HEXTMP from the engine rotation speed Ne in the step S6. The exhaust temperature correction value HEXTMP can be established with finer precision by considering the engine load, etc.

In a step S7, an EGR valve target opening area EGRAR is calculated by the aforesaid equation (2). In other words, the EGR valve target opening area EGRAR is calculated by the following formula using the total flow area Aa of the intake system found in the step S2, the target EGR factor EGRQ set in the step S5, and the exhaust pressure correction value HEXPRS and exhaust temperature correction value HEXTMP found in the step S6.

$$EGRAR = EGRQ \cdot Aa \cdot HEXPRS \cdot HEXTMP$$

In a step S8, a control signal is output to the EGR valve 6 so as to achieve the EGR valve target opening area EGRAR. In this way, the opening of the EGR valve 6 is appropriately corrected in all driving regions of the engine.

Figures 7A, 7B:
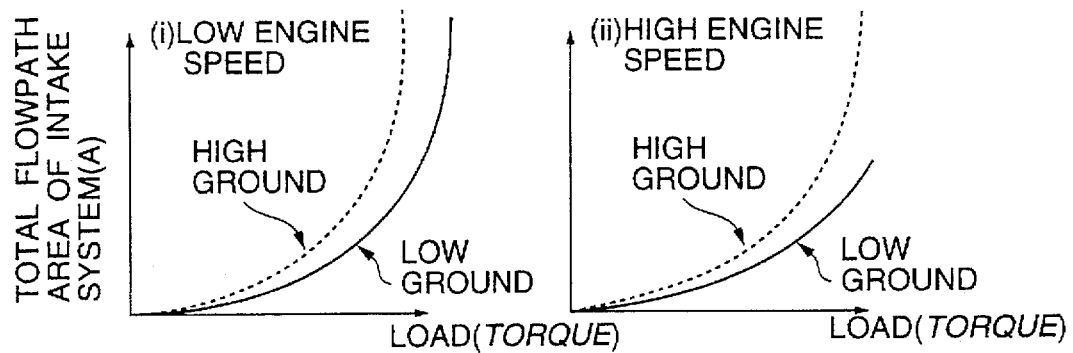
FIGS. 7A and 7B are graphs which compare a total flowpath area of an intake system for low rotation speed and high rotation speed according to this invention.
Figures 8A, 8B:
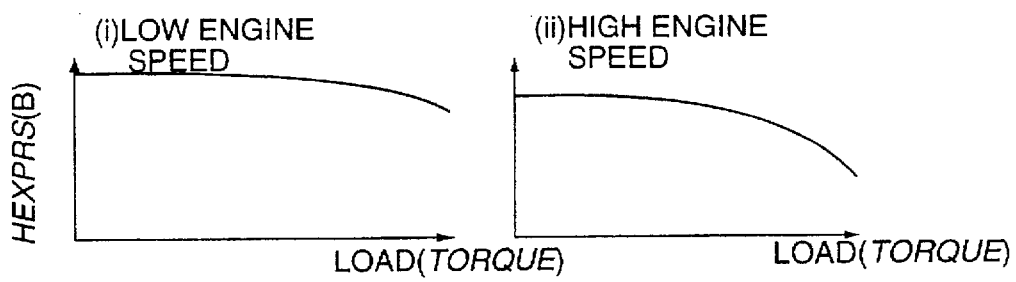
FIGS. 8A and 8B are graphs which compare exhaust pressure correction value characteristics for low rotation speed and high rotation speed according to this invention.
Figures 9A, 9B:
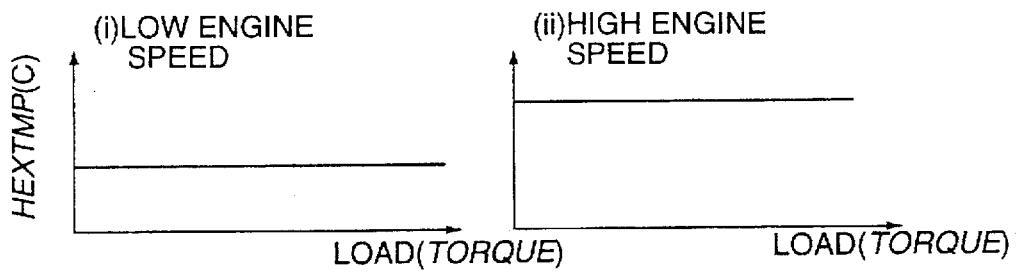
FIGS. 9A and 9B are graphs which compare exhaust temperature correction characteristics for low rotation speed and high rotation speed according to this invention.

When the vehicle is running on high ground and low ground, the flowpath area of the intake system to obtain the same torque are different as shown in FIGS. 7A and 7B. According to this invention, the exhaust pressure correction value HEXPRS changes according to the engine load (torque) and engine rotation speed as shown in FIGS. 8A, 8B, and the exhaust temperature correction value HEXTMP varies according to the engine rotation speed as shown in FIGS. 9A, 9B.

Figures 10A, 10B:
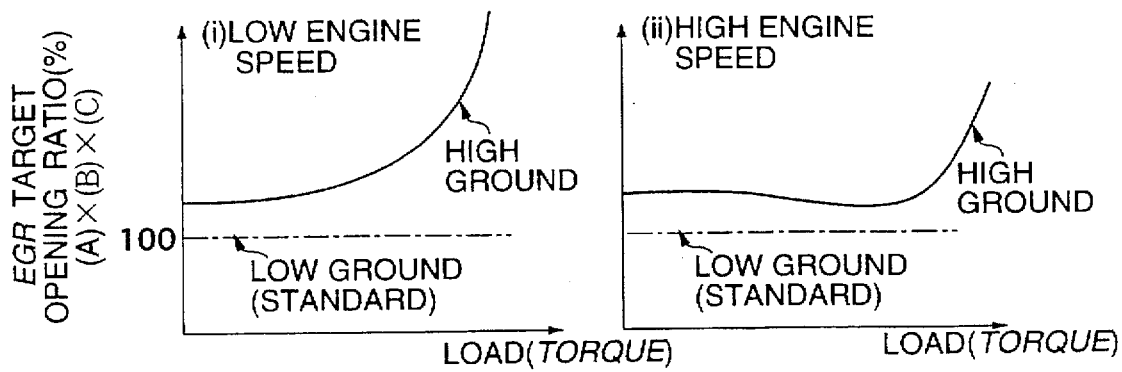
FIGS. 10A and 10B are graphs which compare an EGR target opening cross-sectional area for low rotation speed and high rotation speed according to this invention.

FIGS. 10A, 10B compare the opening areas of the EGR valve for which the same EGR rate was obtained on low ground and high ground. The ratio of opening areas of the EGR valve on low ground and high ground varies according to the engine rotation speed and engine load, as shown by these diagrams.

By correcting the target opening area EGRAR of the EGR valve obtained by equation (2) by the pressure correction value HEXPRS and exhaust temperature correction value HEXTMP, an opening area ratio of the EGR valve corresponding to these characteristics is obtained. The EGR ratio on high ground and low ground therefore becomes the same in all engine speed and load regions.

The equation (1) applies to the low load region of the engine, and the target EGR ratio EGRQ in the high load region is given by the following formula (3).

$$EGRQ = K \cdot \left(\frac{RGRAR}{Aa}\right) \cdot \sqrt{\frac{\text{exhaust pressure} - \text{intake air pressure}}{\text{atmospheric pressure} - \text{intake air pressure}}} \cdot \sqrt{\frac{\text{outside temperature}}{\text{EGR gas temperature}}} \quad (3)$$

The process of obtaining the above equation (3) will be discussed later together with that of obtaining the equation (1).

When the modified version (2) of equation (1) is applied to the high engine load region, an error occurs in the calculation of the EGR valve opening area EGRAR.

Figure 3:
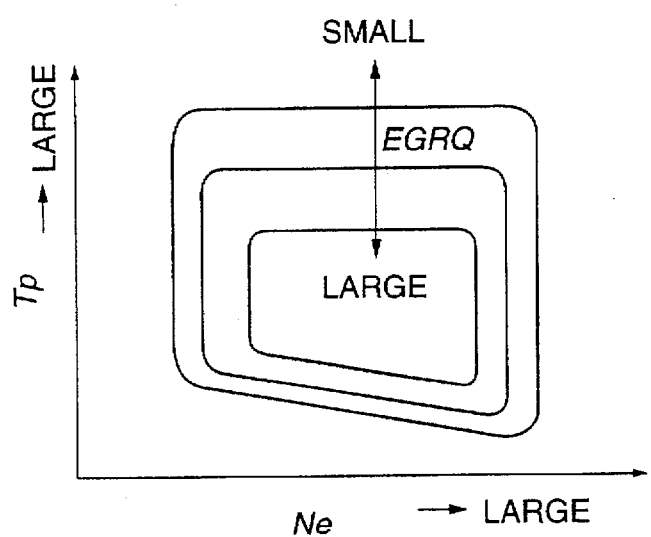
FIG. 3 is a graph showing the contents of a map of a target EGR rate EGRQ stored in the EGR controller.

However as can be seen from equation (3), the increased calculation error in the EGR factor EGRQ corresponds to the case of high intake air pressure, and in this case, the target EGR factor EGRQ is suppressed beforehand to a low value as shown in FIG. 3 to maintain drivability and engine output. The computed EGR valve opening area EGRAR therefore takes a low value, and as the absolute value of the error in this quantity is also small, there is no problem in practice even if the equation (2) is applied for the high engine load region.

It may be noted that this controller does not require an atmospheric pressure sensor, and it can therefore be constructed economically.

Finally, a process of obtaining the aforesaid equations (1) and (3) will be explained.

The flowrate characteristics of a compressible fluid are expressed by the following equations (4) and (5). These are theoretical equations derived from Bernouille's theorem (cf. page B5–209 of JSME Mechanical Engineer's Handbook issued in 1986 by Japan Society of Mechanical Engineering).

At sonic speed:

$$q = 0.00189 \cdot Cd \cdot A \cdot p_1 \cdot \sqrt{\frac{273}{T_1}} \quad (4)$$

At subsonic speed:

$$q = 0.00378 \cdot Cd \cdot A \cdot \sqrt{\frac{p_2 \cdot (p_1 - p_2) \cdot 273}{T_1}} \quad (5)$$

where, q=volume flowrate (Nm³/sec),

Cd=flow coefficient of throttle,

A=flow are of throttle (m²), p₁=absolute pressure upstream of throttle (kg/m³), p₂=absolute pressure downstream of throttle (kg/m³), and T₁=fluid temperature upstream of throttle (K).

The inventors derived the following approximate equations representing the intake air flowrate Q from the above equations (4) and (5):

At sonic speed:

$$Q = 2 \cdot Ka \cdot Cda \cdot Aa \cdot Pa \cdot \sqrt{\frac{273}{Ta}} \quad (6)$$

At subsonic speed:

$$Q = 2 \cdot Ka \cdot Cda \cdot Aa \cdot \sqrt{\frac{Pin \cdot (Pa - Pin) \cdot 273}{Ta}} \quad (7)$$

where,

Ka=constant,

Cda=flow coefficient of throttle part of intake system,

Aa=total flow area of intake system,

Pin=absolute pressure of intake air,

Pa=atmospheric pressure, and

Ta=atmospheric temperature

Likewise, the following approximate equation was derived for the EGR flowrate $Q_{EGR}$.

At sonic speed:

$$Q_{EGR} = k_{EGR} \cdot Cd_{EGR} \cdot EGRAR \cdot P_{EGR} \cdot \sqrt{\frac{273}{T_{EGR}}} \quad (8)$$

At subsonic speed:

$$Q_{EGR} = 2 \cdot k_{EGR} \cdot Cd_{EGR} \cdot EGRAR \cdot \sqrt{\frac{Pin \cdot (P_{EGR} - Pin) \cdot 273}{T_{EGR}}} \quad (9)$$

where, $K_{EGR}$=constant, $Cd_{EGR}$=flow coefficient of EGR valve,

EGRAR=opening area of EGR valve, $P_{EGR}$=exhaust pressure, and $T_{EGR}$=temperature of EGR gas.

Figure 13:
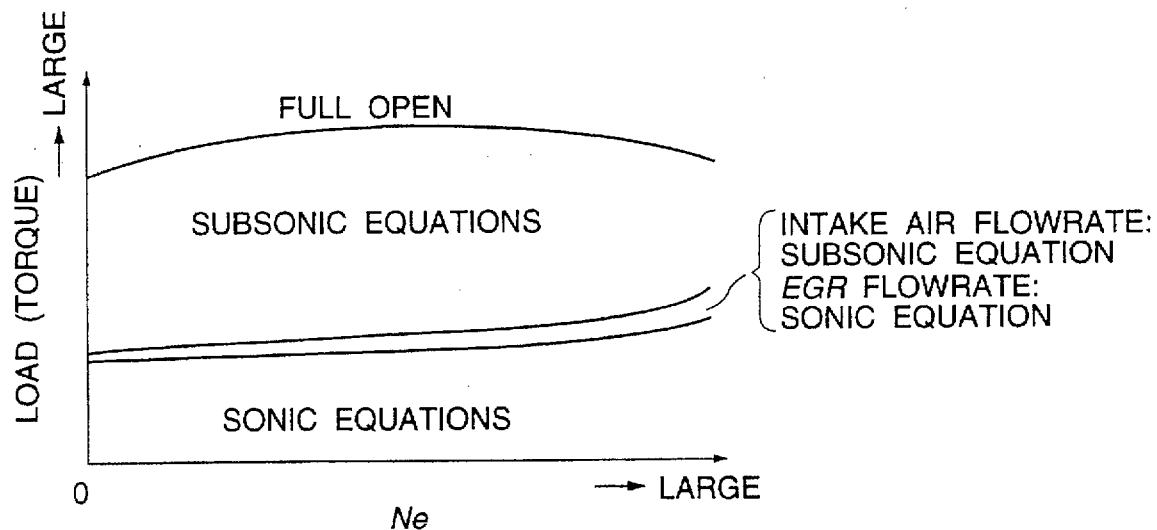
FIG. 13 is a graph showing application regions of sonic and subsonic equations for calculating the target EGR rate EGRQ, according to this invention.
Figure 14:
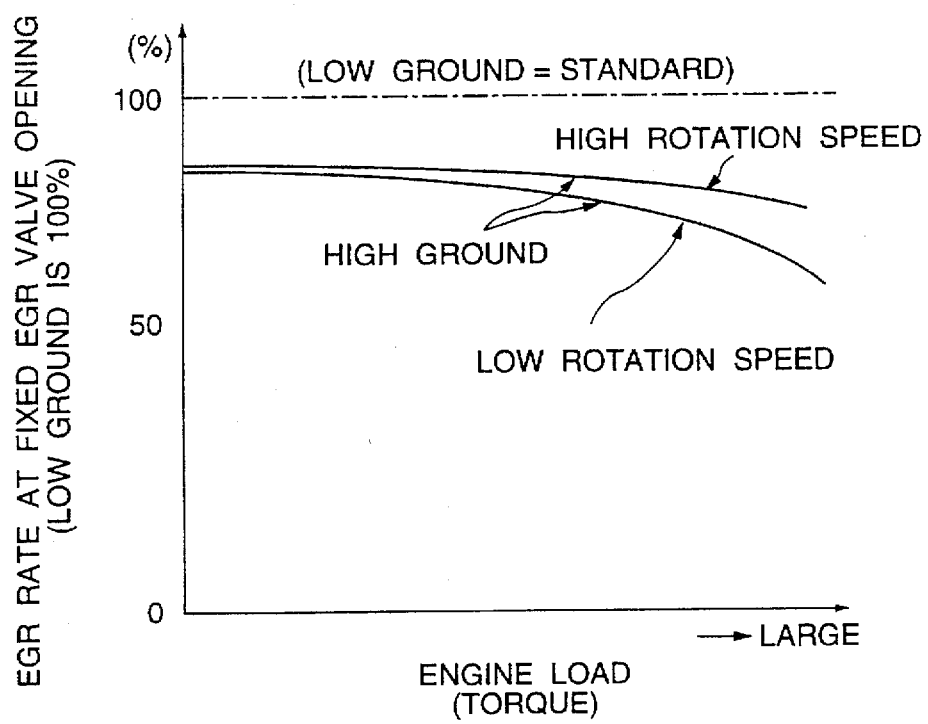
FIG. 14 is a graph which compares engine load and engine rotation speed on low ground and high ground in conventional EGR control.

Whether the intake air flowrate and EGR flowrate should be expressed by either the equation for sonic speed or the equation for subsonic speed is determined by comparing the pressures before and after the throttle. In the case of an engine, they both follow the sonic speed equation at low load from the relation between atmospheric pressure, intake air pressure, exhaust pressure and rotation load, while at high load they follow the subsonic speed equation as shown by the graph of FIG. 13.

From these experimental results and the above equations, the EGR rate may be defined as follows.

For high load (intake air flowrate and EGR flowrate both follow subsonic speed equation):

$$EGRQ = \frac{Q_{EGR}}{Q} = K \cdot \frac{EGRAR}{Aa} \cdot \sqrt{\frac{P_{EGR} - Pin}{Pa - Pin}} \cdot \sqrt{\frac{Ta}{T_{EGR}}} \quad (10)$$

For medium load (intake air flowrate follows subsonic speed equation and EGR flowrate follows sonic speed equation):

$$EGRQ = \quad (11)$$

$$\frac{Q_{EGR}}{Q} = K \cdot \frac{EGRAR}{Aa} \cdot \frac{P_{EGR}}{2 \cdot Pin \cdot (Pa - Pin)} \cdot \sqrt{\frac{Ta}{T_{EGR}}}$$

For low load (intake air flowrate and EGR flowrate both follow sonic speed equation):

$$EGRQ = \frac{Q_{EGR}}{Q} = K \cdot \frac{EGRAR}{Aa} \cdot \frac{P_{EGR}}{Pa} \cdot \sqrt{\frac{Ta}{T_{EGR}}} \quad (12)$$

where, $K = \frac{K_{EGR}}{Ka} \cdot \frac{Cd_{EGR}}{Cda}$.

The above equation (12) corresponds to equation (1) and equation (10) corresponds to equation (3). It should be noted that since the medium load region to which equation (11) applies is very narrow, as shown in FIG. 13, the equation (11) may be out of consideration.

The embodiments of this invention in which an exclusive property or privilege is claimed are defined as follows:

1. An exhaust gas recirculation controller for use with an engine, said engine comprising an intake passage and exhaust passage connected by an exhaust gas recirculation passage provided with an exhaust recirculation valve, comprising:

means for detecting a running state of said engine, means for setting a target exhaust gas recirculation rate according to said running state, means for computing a total intake air flow cross-sectional area of said engine comprising said air intake passage, means for setting a first correction amount of said target exhaust gas recirculation rate according to an exhaust pressure of said engine, means for setting a target opening amount of said exhaust gas recirculation valve based on said target exhaust recirculation rate, total intake flow cross-sectional area and first correction value, and means for controlling the opening of said exhaust gas recirculating valve to the target opening.

2. An exhaust gas recirculation controller as defined in claim 1, further comprising means for detecting an exhaust temperature of said engine, and means for setting a second correction value of the target exhaust gas recirculation rate based on said exhaust temperature, wherein said target opening amount setting means sets said target opening amount of said exhaust gas recirculation valve based on said target exhaust gas recirculation rate, the total intake air flow cross-sectional area, the first correction value and the second correction value.

3. An exhaust gas recirculating controller as defined in claim 2, wherein said exhaust temperature detecting means comprises means for detecting a rotation speed of said engine.

4. An exhaust gas recirculating controller as defined in claim 1, wherein said exhaust temperature detecting means comprises an air flow meter for detecting intake air flowrate of said engine.

5. An exhaust gas recirculating controller as defined in claim 1, wherein said intake passage comprises a throttle and an auxiliary air passage provided with an auxiliary air valve for bypassing said throttle, and said computing means comprises means for detecting an opening of said throttle, means for detecting an opening of said auxiliary air valve, and means for calculating said total intake air flow cross-sectional area from the opening of said throttle and the opening of said auxiliary air valve.

* * * * *